United States Patent [19]

Baker, Jr.

[11] Patent Number: 4,594,890
[45] Date of Patent: Jun. 17, 1986

[54] FLUID FLOW MEASURING DEVICE

[76] Inventor: Hugh M. Baker, Jr., Green Hills Lake, P.O. Box 27B, R.D. 1, Mohnton, Pa. 19540

[21] Appl. No.: 593,930

[22] Filed: Mar. 27, 1984

Related U.S. Application Data

[63] Continuation of Ser. No. 404,888, Aug. 3, 1982, abandoned, which is a continuation of Ser. No. 243,974, Mar. 16, 1981, abandoned, which is a continuation of Ser. No. 90,583, Nov. 2, 1979, abandoned.

[51] Int. Cl.$^4$ .............................................. G01F 3/36
[52] U.S. Cl. ....................................... 73/232; 73/269
[58] Field of Search ................. 73/232, 252, 262, 263, 73/269, 270, 279, 861.47; 251/75

[56] References Cited

U.S. PATENT DOCUMENTS

| | | |
|---|---|---|
| 90,479 | 5/1869 | Baldwin . |
| 117,094 | 7/1871 | Mead . |
| 126,951 | 5/1872 | Guthrie et al. . |
| 398,013 | 2/1889 | Welker . |
| 445,552 | 2/1891 | Gurd . |
| 524,411 | 8/1894 | Bel . |
| 1,065,939 | 7/1913 | Hanks . |
| 1,190,705 | 7/1916 | Bassett . |
| 2,068,378 | 1/1937 | Diehl . |
| 2,869,515 | 1/1959 | Platzer .................................. 73/232 |
| 3,426,800 | 2/1969 | Bauer ................................ 251/75 X |
| 3,707,982 | 1/1973 | Hogel .................................. 137/119 |
| 4,067,239 | 1/1978 | Arvisenet ............................. 73/270 |

FOREIGN PATENT DOCUMENTS

| | | | |
|---|---|---|---|
| 57551 | 11/1952 | France .................................. 73/262 |
| 753881 | 8/1956 | United Kingdom .................. 73/263 |

OTHER PUBLICATIONS

IBM Technical Bulletin, vol. 6, No. 3, Aug. 1963, pp. 28-29.

Primary Examiner—Stewart J. Levy
Assistant Examiner—John E. Chapman, Jr.
Attorney, Agent, or Firm—G. Turner Moller; Peter Klempay

[57] ABSTRACT

There is disclosed a fluid meter incorporating a bi-stable resilient member positioned in a housing. Fluid flow into and out of the housing causes the bi-stable member to oscillate in a single oscillatory mode. Since each oscillation of the member is proportional to fluid flow into and out of the housing, a mechanism is provided to count the number of oscillations to provide an indication of fluid flow.

14 Claims, 9 Drawing Figures

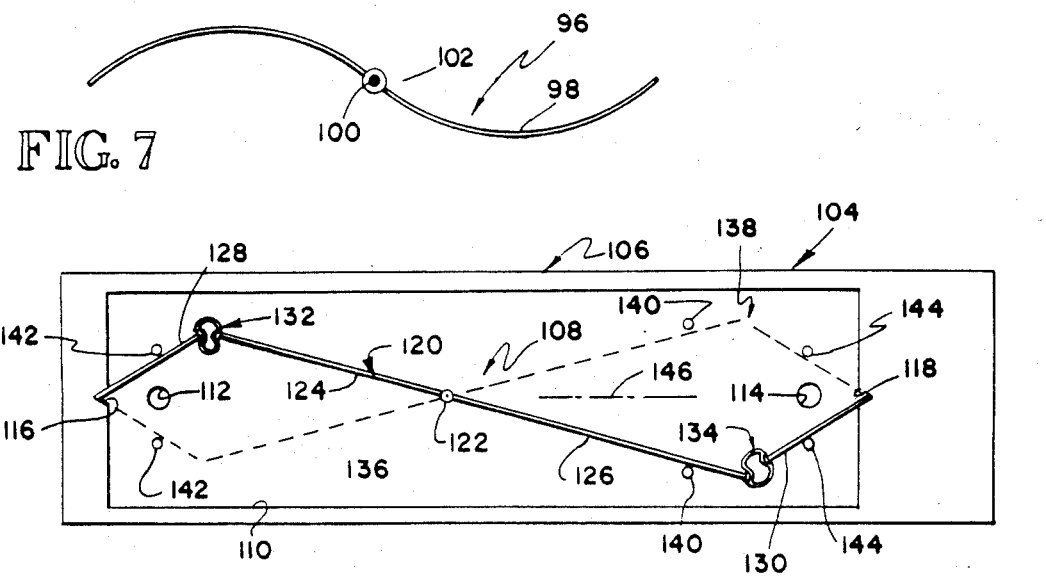
FIG. 7
FIG. 8
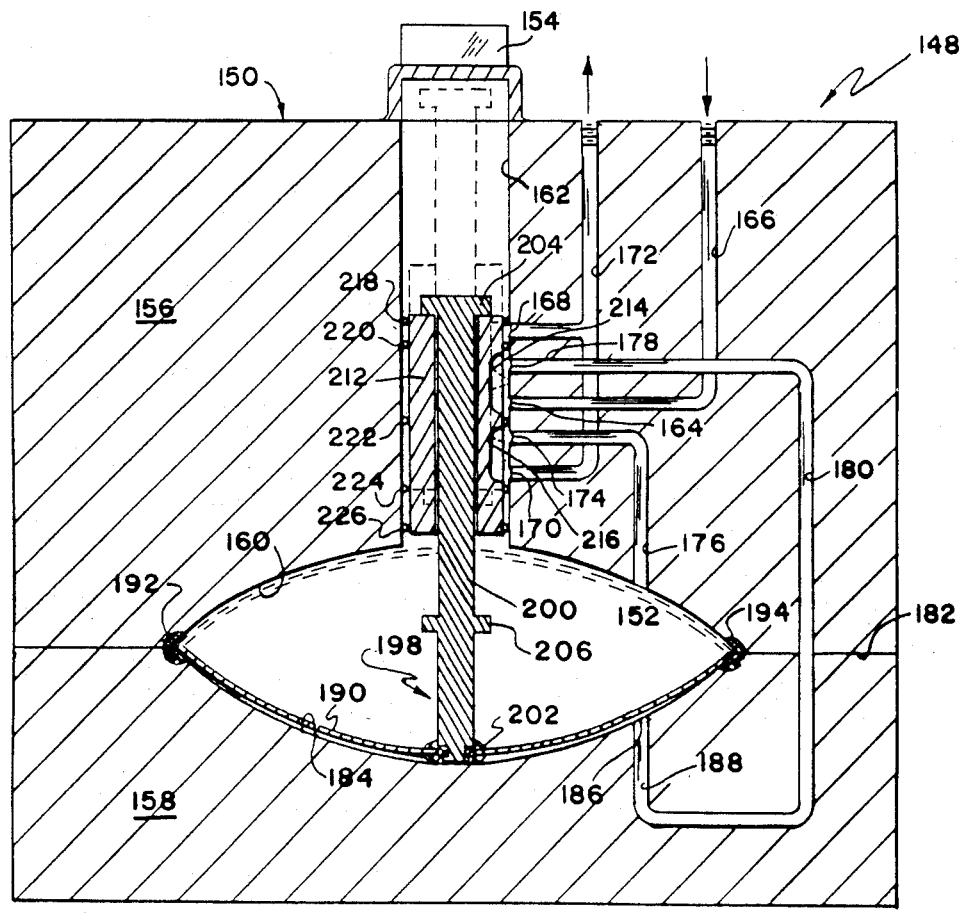
FIG. 9

FLUID FLOW MEASURING DEVICE

This is a continuation of application Ser. No. 404,888, filed Aug. 3, 1982, now abandoned, which is a continuation of application Ser. No. 243,974, filed Mar. 16, 1981, now abandoned, which is a continuation of application Ser. No. 90,583, filed Nov. 2, 1979, now abandoned.

This invention relates to fluid meters and particularly to flow measuring devices which are capable of accurately measuring low fluid flow rates.

Ordinary flow measure devices such as paddle wheels, turbines and the like do not satisfactorily measure low fluid flow rates because the moveable member can remain stationary when the flow rate is fairly low.

Accordingly, low flow rate meters are typically of the positive displacement type and fall into several broad catagories. One such catagory is a rotary vane type sensor provided with well sealed vanes moving in a precision fit housing or casing. Although the state of the art of such devices is quite advanced, rotary vane type meters are inherently expensive to fabricate and are vunerable to the failure of seals which are usually numerous. This type device is also likely to cause considerable pressure drop caused by the drag of seals as fluid flows through the device.

Another broad catagory of the positive displacement type meters capable of handling low flow rates are the bellows or expansible bag type. Although the present state of the art of such devices is such that they are extremely reliable and have long useful lives, it can hardly be denied that they are bulky, inordinately expensive and have a multitude of moving parts.

Of superficial interest relative to this invention is the disclosure in U.S. Pat. No. 398,013 which discloses a fluid meter incorporating a spring member which oscillates in response to fluid flow through the device. Although there are numerous differences between this invention and the disclosure in this patent, it will suffice for present purposes to note that the oscillatable member in this patent obviously is capable of undergoing oscillatory movement in a number of different modes. Since the amount of fluid passing through the meter varies depending on the mode of oscillation of the member, it will be evident that the indicated quantity of fluid passing the meter may vary significantly from the actual quantity.

The device of this invention resolves many of the common shortcomings of the positive displacement flow sensing devices. It is simple, one embodiment having a flat strip of resilient material as its only moving part. There are no bearings as with rotating flow meters. The necessary seals are simple and inherently more trouble-free than many of the seals found in conventional flow meters. Although the device would tend to cause pressure pulses downstream thereof, the average pressure drop across the device is quite low. The device is particularly adept at measuring low flow rates and is of the positive displacement variety. The device is inherently inexpensive to fabricate, is small and light, and is substantially maintenance-free.

In summary, one embodiment of the device of this invention includes a housing having an inlet opening adjacent one end thereof and an outlet opening adjacent the other end thereof. A one-piece bi-stable resilient member is placed in the housing and assumes a sinusoidal configuration. The resilient member acts to divide the housing interior into a first cavity communicating with the inlet bounded on one side by a first side of the resilient member. The second side of the resilient member acts to partially define a second cavity in communication with the outlet. As fluid enters the inlet, the first cavity fills up. A pressure differential is created across the resilient member since fluid in the second cavity is being withdrawn from the outlet. Ultimately, the pressure differential between the first and second cavities causes the resilient member to flip or oscillate into its opposite sinusoidal configuration thereby placing the first cavity in communication with the outlet and the second cavity in communication with the inlet. Means are provided to count the oscillations of the resilient member to provide a value proportional to flow.

In accordance with another embodiment of the invention, the bi-stable oscillatable member includes both rigid and resilient components and is pivotally mounted adjacent the center of the housing. Although the second embodiment is somewhat more complex than the first, it provides many advantages over the prior art.

In accordance with another embodiment of the invention, the bi-stable oscillatable member includes a disc sealed around the periphery thereof to the meter housing and carries a rod which manipulates a valve to control fluid flow from an inlet to opposite sides of the disc.

It is an object of this invention to construct and arrange the oscillatable assembly to provide that a constant amount of fluid passes through the housing for each oscillation of the assembly. To this end, the assembly is designed to have only one mode of oscillation, herein termed mono-oscillatable, and to be bi-stable, i.e. have only two stable positions, one at each end of its range of oscillatory movement. The oscillatable assembly of this invention has several additional characteristics. First, in order to move away from one of its stable positions, a force must be applied thereto by fluid passing through the meter. Second, as the assembly reaches a location intermediate its two stable positions, a spring force provided by the assembly acts to drive the assembly completely to its second stable position. In effect, the assembly has an "over center" position to which it must be driven by a force imparted by the fluid being measured. Immediately after passing the "over center" position, the spring force of the assembly drives the assembly to its other stable position to complete a half cycle of oscillation.

It is an object of this invention to provide an improved flow meter.

Another object of the invention is to provide an improved flow meter which is particularly adept at measuring low rates of fluid flow.

Other objects and advantages of this invention will become more fully apparent as this description proceeds, reference being made to the accompanying drawings and claims.

IN THE DRAWING:

FIG. 7 is a view similar to FIG. 5 of another embodiment of this invention;

FIG. 8 is a top view of another embodiment of the invention illustrating an oscillatable assembly of somewhat different configuration; and FIG. 9 is a view of a further embodiment of the invention.

Figure 1:
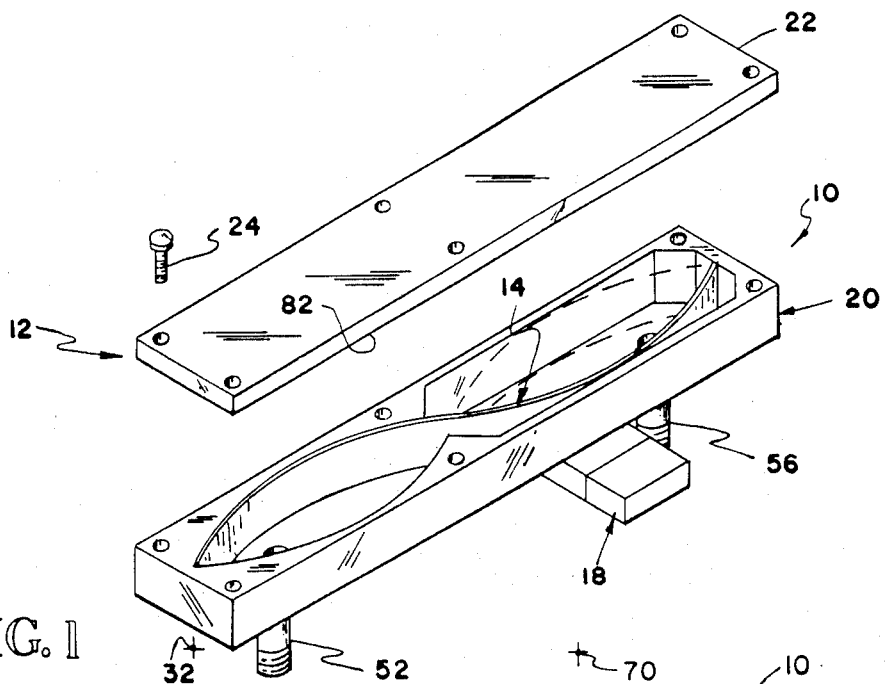
FIG. 1 is a partially exploded isometric view of one embodiment of the flow meter of this invention.
Figure 2:
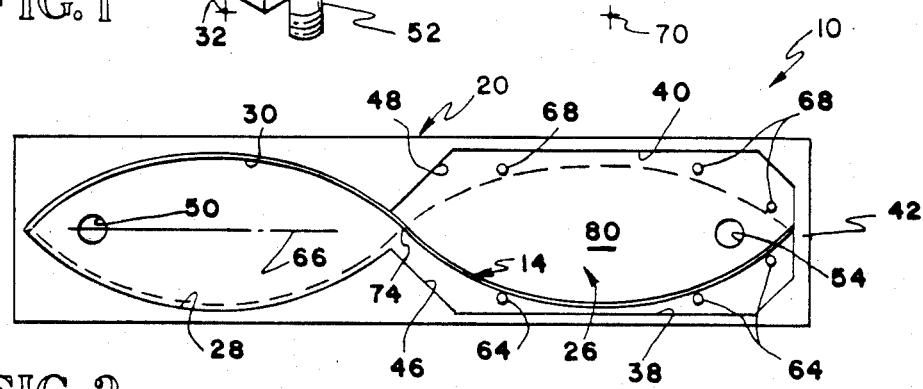
FIG. 2 is a top view of the flow meter of FIG. 1, with the housing cover removed, illustrating the two natural or normal positions of the oscillating element.
Figure 3:
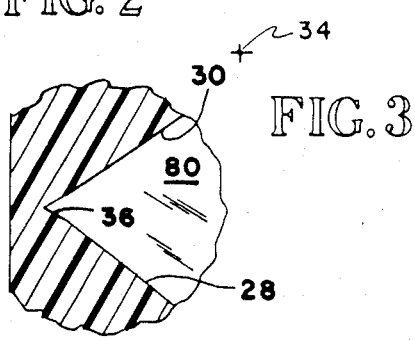
FIG. 3 is an enlarged view of the inlet end of the housing of FIGS. 1 and 2.
Figure 4:
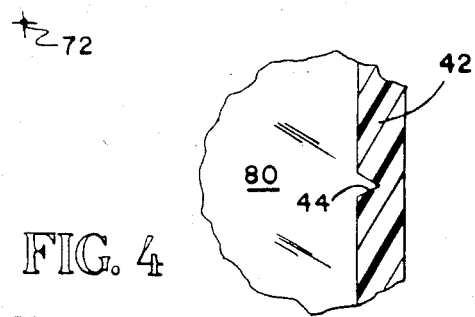
FIG. 4 is an enlarged view of the outlet end of the housing of FIGS. 1 and 2.
Figure 5:
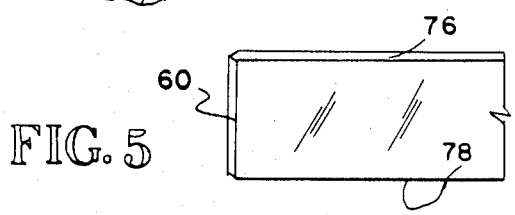
FIG. 5 is a view similar to FIG. 3 illustrating another configuration of the oscillating member.

Referring to FIGS. 1-3, there is illustrated a flow meter 10 comprising one embodiment of this invention and including a housing 12, an assembly 14 moveable inside the housing 12, means for constraining movement of the assembly 14 and a mechanism 18 for counting the oscillations of the assembly 14.

The housing 12 may be of any suitable type and is illustrated as including a base 20 and a cover 22 interconnected by suitable fasteners 24. The base 20 provides a recess 26 having an inlet end defined by walls 28, 30 of smoothly arcuate shape which are preferably segments of a cylinder having centers 32, 34 spaced substantially from the base 20. As shown best in FIG. 3, the recess walls 28, 30 converge toward a notch 36 which receives one end of the resilient assembly 14 as will be more fully pointed out hereinafter.

The outlet end of the recess 26 preferably comprises generally parallel longitudinally extending walls 38, 40 which are spanned by an end wall 42 having a notch 44 in the center thereof for receiving the opposite end of the resilient assembly 14 as will be pointed out more fully hereinafter. The walls 38, 40 merge with the walls 28, 30, respectively, by a pair of generally convergent walls 46, 48.

An inlet 50 opens into the recess 26 adjacent the notch 36 and is connected to a suitable stub conduit 52 for connection to a source (not shown) of the fluid to be measured. An outlet 54 opens into the recess 26 adjacent the notch 44 and communicates with a stub conduit 56 for delivering the metered fluid to a suitable destination.

In the embodiment of FIGS. 1-5, the resilient assembly 14 comprises a simple flat strip 58 of resilient material which is conveniently of metal. The ends 60, 62 of the strip 58 are beveled to fit into the notches 36, 48 to provide both a bearing and a sealing function. The length of the strip 58 is substantially greater than the longitudinal straight line distance between the notches 36, 44 so that the strip 58 assumes one of its two normal sinusoidal shapes as suggested in FIG. 2. Because the strip 58 is supported at both ends, there is no tendency for the strip to elongate during oscillatory movement.

Also positioned in the recess 26 is the constraining means 16 which acts to assure that the resilient assembly oscillates in only one oscillatory mode which, in the illustrated embodiment of FIGS. 1-5, is the "s" and "reverse s" shapes. At the inlet end of the recess 26, the constraining means 16 comprises the cylindrical segment walls 28, 30 which manifestly prevent movement of the strip 58 beyond the confines thereof. In the outlet end of the recess 26, the constraining means 16 comprises a series of upstanding pins 64 on one side of the longitudinal center line 66 and a second plurality of upstanding pins 68 on the other side of the center line 66. Upon inspection, it will be evident that the pins 64 are positioned such that the discharge end of the strip 58 may assume an upwardly concave, generally cylindrical configuration having a center 70 while the pins 68 constrain movement of the discharge end of the strip 58 into a downwardly concave, generally cylindrical configuration having a center of curvature 72. It will be evident that the centers 32, 34, 70, 72 are substantially equidistantly spaced from the axis 66. It will be seen that the space between the pins 64 and the wall 38 allows passage of the metered fluid into the discharge end of the recess 26 when the strip 58 is in the solid line position shown in FIG. 2. Accordingly, the pressure differential between the inlet and outlet 50, 52 is fully applied across the discharge end of the strip 58 tending to move it toward the dashed line position. Similarly, when the assembly 14 is in the dashed line position, the full pressure drop existing between the inlet and outlet 50, 54 is applied against the discharge end of the strip 58. Whenever this pressure differential is sufficient to overcome the inertia and spring characteristics of the strip 58, the strip will oscillate or flip into its opposite or sinusoidal position about a single node 74.

The counter 18 may be of any suitable type to sense and record the number of oscillations of the assembly 14. One mechanical type device is illustrated in U.S. Pat. No. 398,013. Alternative counting techniques which are entirely suitable include indirect nonmechanical approaches such as a photoelectric or electromagnetic approach in which the movable member breaks an optical or magnetic field.

It will be evident that the upper and lower surfaces 76, 78 of the strip 58 seal against the bottom 80 of the recess 26 and against the underside 82 of the cover 22. Since the tolerances of these surfaces are relatively easy to hold, it will be evident that the required sealing is inexpensive to provide and should be of considerable useful life.

If the node 74 were exactly in the areal center of the strip 58, it would appear that the strip 58 would be immobile since the pressure acting on the discharge end of the strip 58 would create a force exactly equal to the force created on the inlet end thereof. This does not create as much of a problem as may be supposed for several reasons. First, given the location of the convergent walls 46, 48, there is always a longer unsupported length of the strip 58 on the discharge end of the housing 12 which will assure that there is an imbalanced force acting on the strip 58 as the pressure differential thereacross reaches the designed flip pressure. It may be desirable, however, to design the housing 12 so that the length of the strip 58 for the node 74 to the notch 44 is greater than from the node 74 to the notch 36 to facilitate flipping of the strip 58.

Several features of the flow meter 10 should now be apparent. The strip 58 is positionable in either of only two stable positions: the "s" or "reverse s" configurations as shown in the solid and dashed lines in FIG. 2. In addition, the strip 58 acts as a partition to divide the recess 26 into a first cavity where the inlet 50 is on a first side 80 of the strip 58 and the outlet 54 is on a second side 82 thereof in the first position of the strip 58. When the strip 58 has been flipped or oscillated into its second or dashed line position, the outlet 54 is on the first side 80 and the inlet 50 is on the second side 82.

The length/width ratio of the strip 58 has several effects. The length/width ratio is preferably high, i.e., 10 or greater, although there are some non-symmetrical shapes where this is not necessarily so. If the ratio of length/width gets too high, i.e. beyond 20, it becomes more difficult to assure that the strip 58 will not distort into a compound figure which would not be bi-stable nor necessarily oscillate in a single mode. The size, location and shape of the inlet and outlet 50, 54 may also play a role in the selected length/width ratio. It appears that the smaller the inlet and outlet 50, 54, the greater can be the length/width ratio. The length/width ratio also obviously plays a major role in the pressure drop across the device. Assuming the same stiffness of the strip 58, a greater length/width ratio will result in a lower pressure drop across the flow meter 10.

Although the obvious selection for the material of the strip 58 is metal, there are any number of suitable materials which may be used. So long as the strip 58 is flexible enough to assume the generally sinusoidal configurations and is not so limp as to simply follow the confines of the recess 26, it is likely operative. The strip 58 must, of course, be rigid in the width dimension in order to assure sealing between the strip 58 and the housing 12. Accordingly, there are a wide variety of materials which may be suitable for the strip 58 including plastics, composite structures such as laminants and the like.

Figure 6:
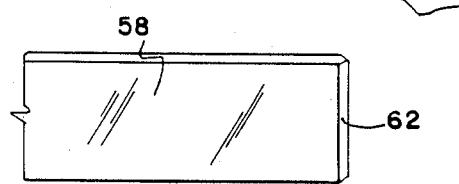
FIG. 6 is a view similar to FIG. 2 illustrating another embodiment of the invention.

Referring to FIG. 6, there is illustrated another embodiment 84 of the resilient assembly 14. The assembly 84 comprises an elongate strip of material having beveled ends, 86, 88 received in the notches 36, 44, first end portions 90, 92 of reduced rigidity or increased flexibility and a region 94 of increased rigidity or decreased flexibility. The regions 90, 92 may exhibit flexibility on the same order of magnitude as the strip 58. The region 94 is illustrated as being of increased thickness although the change in rigidity may be accomplished by other means. The purpose of the region 94 is to provide a technique for constraining the assembly 84 into bi-stable sinusoidal movement either in addition to or in lieu of one or more of the elements of the constraining means 16. Since the first tendency of any sinusoidally oscillating member to assume a different mode of oscillation is a two node, "m" to "w" configuration, stiffening of the center of the assembly 84 will substantially minimize this tendency. The increased rigidity of the portion 94 and the length thereof are subject to many variables depending on the expected rate of movement of the assembly 84, the flexibility of the portions 90, 92 and other factors as will be apparent to those skilled in the art.

Referring to FIG. 7, there is schematically illustrated another embodiment 96 of the resilient assembly of this invention. The assembly 96 is illustrated as comprising a strip 98 of resilient material of generally uniform flexibility incorporating a generally centrally located pivot pin 100 which extends into a rubber sleeve 102 positioned in a blind opening in the top and/or bottom of the housing 12. The pin connection 100 acts in much the same manner as the region 94 of increased rigidity to prevent the strip 98 from oscillating in its first harmonic mode.

Referring to FIG. 8, there is illustrated a flow meter 104 which differs substantially from the flow meter 10 but which operates on substantially the same principles. The flow meter 104 comprises a housing 106 having an assembly 108 therein which oscillates in a single mode between the generally sinusoidal positions illustrated in solid and dashed lines respectively. Means (not shown) are provided for counting the oscillations of the assembly 108 to provide an indication of fluid flow through the meter 104.

The housing 106 comprises a recess 110 in which the assembly 108 is located and into which opens an inlet 112 and an outlet 114. Suitable notches 116, 118, similar to the notches 36, 44, are provided.

The resilient assembly 108 comprises a central substantially rigid lever 120 mounted by a pin 122 to the housing 106. For purposes which will be more fully apparent momentarily, the pivot pin 122 divides the lever 120 into an inlet segment 124 and a somewhat longer outlet segment 126. A pair of relatively rigid substantially identical arms 128, 130 have one end disposed in the notches 116, 118 and an opposite end adjacent the inlet and outlet segments 124, 126 of the lever 120. Interconnecting the ends of the arms 128, 130 and the ends of the segments 124, 126 are a pair of substantial identical spring members 132, 134 which are illustrated as being of generally "Figure 8" configuration. Conveniently, the ends of the arms 128, 130 and the ends of the lever segments 124, 126 merely fit into the bights of the springs 132, 134. Since the assembly 108 is operating against a flat surface 136 of the recess 110, and operating against a similar surface on the cover (not shown) of the housing 106, it is a relatively simple matter to seal between the assembly 108 and the housing 106.

The meter 104 also comprises means 138 for constraining movement of the assembly 108. The constraining means 138 comprises a first pair of pins 140 limiting movement of the lever 120, a second pair of pins 142 limiting movement of the arm 128 and a third pair of pins 144 limiting movement of the arm 130.

It will be evident that the pivot pin 122 is located off center relative to the assembly 108 to provide a mechanical advantage as will be pointed out hereinafter. As will also be pointed out more fully hereinafter, the lever 120 preceeds the arms 128, 130 to assure that the lever 120 crosses its over center position first while momentarily leaving arms 128, 130 on the former side of the openings 112, 114 until the arms 128, 130 flip to the opposite side. This is accomplished by placement of the pins 140, 142, 144 such that the lever 120 is confined closer to a longitudinal center line 146 than are the arms 128, 130

Operation of the meter 104 is quite similar to the operation of the meter 110. In the configuration shown in solid lines in FIG. 8, fluid above the lever 120 is exiting through the outlet 114, while fluid entering through the inlet 112 is accumulating under the lever 120. When the pressure differential across the lever 120 reaches a predetermined value, the lever 120 begins pivoting toward its dash line position. As the lever 120 passes the center line 146, the springs 132, 134 move the lever 120, the springs 132, 134 and the arms 128, 30 to the dash line position. Fluid under the lever 120 then beings exhausting through the outlet 114 while fluid entering the inlet 112 begins filling up the recess 110 above the lever 120. Flipping of the assembly 108 next occurs when a predetermined pressure drop exists across the assembly 108 and the process is continually repeated.

Referring to FIG. 9, there is illustrated a flow meter 148 which differs substantially from the flow meters 10, 104 but which operates on substantially the same principles. The flow meter 148 comprises a housing 150 having a resilient bi-stable assembly 152 therein which oscillates in a single mode between the positions illustrated in solid and dash lines respectively. Means 154 are provided to count the oscillations of the assembly 152 as will be more fully apparent hereinafter. The housing 150 may be of any suitable type and is illustrated as including a base 156 and a cover 158 interconnected by suitable fasteners (not shown). The base provides a partially spherical recess 160 communicating with an elongate blind cylindrical passage 162. An inlet 164 opens into the passage 162 and communicates through a passage 166 to the exterior of the base 156. A pair of outlet openings 168, 170 communicate through a branched passageway 172 to the exterior of the base 156. An opening 174 in the passage 162 communicates through a passageway 176 and opens through the recess 160. Another port 178 communicates through a passage 180 to an interface 182 between the base 156 and cover 158.

The cover 158 comprises a partially spherical recess 184 providing an opening 186 communicating through a passage 188 to the passageway 180. Suitable gasket material (not shown) may be provided at the interface 182 to avoid fluid loss therethrough.

The assembly 152 comprises a bodily resilient bi-stable disc 190 captivated and sealed about the periphery thereof by an annular sealing ring 192 disposed in complimentary grooves 194 provided by the base 156 and cover 158. The unstressed diameter of the disc 190 is desirably somewhat greater than the diameter of the chamber 196 defined by the recesses 160, 164. Accordingly, the disc 190 is inherently biased to one or the other of its limits of travel. Preferably, a disc is substantially unstressed at its limits of travel defined by the recesses 160, 184 as suggested by the dashed and solid line position shown in FIG. 9.

Affixed to the disc 190 adjacent the center thereof is an elongate valve manipulating mechanism 198 comprising an elongate rod 200 secured to the disc 190 by a resilient coupling 202 and providing a pair of spaced enlargements or bumpers 204, 206. The rod 200 extends through an axial passage in a slide valve 212 mounted for reciprocating movement in the passage 162. The slide valve 212 is designed to alternately connect the inlet 166 and outlet 172 to the passages 176, 180 in order to drive the bi-stable disc in opposite directions in its oscillatory mode.

To this end, the slide valve 212 comprises an annular body having recesses 214, 216 therein and a plurality of seals 218, 220, 222, 224, to seal between adjacent ones of the ports 164, 168, 170, 174, 178 as will be apparent hereinafter. The showing of FIG. 9 illustrates the assembly 152 at one limit of its travel. In this situation, fluid passing through the inlet 166 passes into the valve recess 214, into the passageway 180 and is accordingly directed through the port 186 between the disc 190 and the recess 184. Simultaneously, fluid between the disc 190 and the recess 160 is capable of flowing through the passageway 176 and the valve recess to exit through the outlet 172.

As fluid enters between the disc 190 and the recess 184, the disc 190 is raised thereby elevating the rod 200 so that the bumper 206 begins to approach the slide valve 212. When the pressure differential across the disc 190 reaches a predetermined value, the disc 190 flips to its other stable position suggested by the dashed lines in FIG. 9. During this movement of the disc 190, the bumper 206 engages the bottom of the slide valve body 212 thereby elevating the slide valve 212 and changing the valve relationship between the inlet 166, the outlet 172, and the passages 176, 180.

It will be evident that, after the disc 190 flips to the dashed line position, the outlet 172 communicates through the valve recess 214 to the passage 180 thereby allowing fluid between the disc 190 and the recess 184 to exhaust through the outlet 172. Similarly, the inlet 166 is in communication with the valve recess 216 and the passage 176 to admit fluid between the disc 190 and the recess 160. It will be evident that the seals 218, 220, 224, 226 are adequate to seal between the operative and inoperative ports and/or to isolate the inoperative ports openings into the passage 162.

In all of the embodiments of this invention, the bi-stability of the resilient oscillatable assembly assures that a constant amount of fluid passes through the housing during each half cycle of oscillation. In addition, by making the oscillatable assembly bi-stable, as opposed to an additional element, considerable simplicity is afforded.

Although the invention has been described in its preferred forms with a certain degree of particularity, it is understood that the present disclosure of the preferred forms is only by way of example and that numerous changes in the details of construction and the combination and arrangement of parts may be resorted to without departing from the spirit and scope of the invention as hereinafter claimed.

I claim:

1. A fluid meter comprising
   a housing having a cavity therein;
   a bi-stable resilient member housed within and dividing the cavity into first and second chambers and being mono-oscillatably movable between only a pair of stable positions in response to fluid flow into and out of the chambers, the resilient member having spring bias and being constrained for movement into one of only the pair of stable positions;
   means providing fluid communication into and out of the first and second chambers, the direction of fluid flow to and from the chambers being determined by the position of the bi-stable resilient member; and
   means for counting the oscillations of the member.

2. The fluid meter of claim 1 wherein the member comprises a disc and means for sealing the edge of the disc to the housing.

3. The fluid meter of claim 2 wherein the means providing fluid communication includes a first opening on one side of the disc, a second opening on the other side of the disc, first and second conduit means respectively connecting the first and second openings to a valve location, a valve movable at the location for alternately supplying and exhausting fluid to the first and second conduits and means operative by the disc for moving the valve.

4. The fluid meter of claim 3 wherein the valve comprises a slide valve having a passage therethrough and the moving means comprises a rod in the passage and movable by the disc, the rod carrying means for shifting the valve.

5. The fluid meter of claim 4 wherein the shifting means comprises first and second shoulders on the rod spaced apart greater than the length of the valve.

6. A fluid meter comprising
   a housing providing a cavity having first and second openings therein, the first opening comprising an inlet and the second opening comprising an outlet;
   a bi-stable resilient assembly including first and second sides and ends, dividing the cavity into first and second chambers communicating respectively with the first and second openings, being mono-oscillatably movable between only a pair of stable positions in response to fluid flow into and out of the chambers, the resilient assembly being spring biased and constrained for movement into one or only the pair of stable positions, the assembly being mounted for oscillatable movement is response to fluid flow through the housing between a first of the pair of stable positions wherein the inlet is on the first side and the outlet is on the second side and a second pair of stable positions wherein the inlet is on the second side and the outlet is on the first side, the assembly further comprising means for sealing between the housing and the ends; and means for counting the oscillations of the assembly.

7. The fluid meter of claim 6 further comprising means constraining the assembly for oscillatory movement in a single oscillatory mode about a single node located intermediate the housing ends.

8. The fluid meter of claim 6 wherein the housing provides a recess having a first portion communicating with the inlet and providing first and second smoothly arcuate concave facing walls and a second portion communicating with the first portion and the outlet, the assembly includes an elongate resilient member having a portion residing in the first recess portion and being movable between the first position wherein the second side abuts the first arcuate wall and the second position wherein the first side abuts the second arcuate wall, the smoothly arcuate walls comprising part of the constraining means.

9. The fluid meter of claim 8 wherein the first and second arcuate walls define segments of a cylinder having axes transverse to and spaced from an axis between the inlet and outlet.

10. The fluid meter of claim 8 wherein the constraining means includes a plurality of spaced abutments in the second recess portion defining first and second arcuate constraints for the resilient member, the first and second constraints being spaced on opposite sides of an axis between the inlet and outlet.

11. The fluid meter of claim 6 wherein the assembly comprises a resilient member having end sections of predetermined flexibility and a second intermediate the end sections of less flexibility than the end sections.

12. The fluid meter of claim 6 wherein the assembly comprises a resilient member extending from the inlet to the outlet and further comprising means constraining the member for movement between the first and second positions including a pin connection between the housing and an intermediate portion of the resilient member for allowing sinusoidal movement of the member and substantially precluding other modes of member oscillation.

13. The fluid meter of claim 6 wherein the resilient assembly comprises a strip of bodily resilient material.

14. The fluid meter of claim 6 wherein the resilient assembly comprises a central rigid section, means pivotally mounting the rigid section for pivotal movement about an axis, first and second end sections adjacent opposite ends of the first section and spring means interconnecting the rigid section with the end sections.

* * * * *